(12) United States Patent
Renwick et al.

(10) Patent No.: US 11,034,460 B2
(45) Date of Patent: Jun. 15, 2021

(54) ADDITIVELY MANUFACTURED SEPTA FOR ACOUSTIC PANELS

(71) Applicant: The Boeing Company, Chicago, IL (US)

(72) Inventors: Zachary B. Renwick, Saint Louis, MO (US); Brandon L. Bertolucci, Seattle, WA (US); Eric Herrera, Mukilteo, WA (US); Michael William Hayes, Belleville, IL (US); John C. Waldrop, III, St. Peters, MO (US); Matthew Scott Thompson, Madison, AL (US)

(73) Assignee: The Boeing Company, Chicago, IL (US)

( * ) Notice: Subject to any disclaimer, the term of this patent is extended or adjusted under 35 U.S.C. 154(b) by 749 days.

(21) Appl. No.: 15/836,034

(22) Filed: Dec. 8, 2017

(65) Prior Publication Data
US 2019/0176998 A1 Jun. 13, 2019

(51) Int. Cl.
*B64D 33/02* (2006.01)
*B33Y 80/00* (2015.01)
(Continued)

(52) U.S. Cl.
CPC .......... *B64D 33/02* (2013.01); *B29C 64/106* (2017.08); *B29D 99/0089* (2013.01); *B33Y 10/00* (2014.12); *B33Y 30/00* (2014.12); *B33Y 80/00* (2014.12); *G10K 11/168* (2013.01); *G10K 11/172* (2013.01); *B29K 2701/12* (2013.01); *B29L 2007/002* (2013.01); *B32B 2260/023* (2013.01); *B32B 2307/10* (2013.01);
(Continued)

(58) Field of Classification Search
CPC ........ B29C 64/118; B01D 29/018; F02C 7/24
See application file for complete search history.

(56) References Cited

U.S. PATENT DOCUMENTS

| | | | | |
|---|---|---|---|---|
| 5,004,070 A | * | 4/1991 | Wang | ........................ E04B 1/86 181/286 |
| 8,047,329 B1 | * | 11/2011 | Douglas | ............... G10K 11/172 181/292 |

(Continued)

FOREIGN PATENT DOCUMENTS

| | | |
|---|---|---|
| EP | 2389501 A1 | 11/2011 |
| WO | 2010085695 A1 | 7/2010 |
| WO | 2019018252 A1 | 1/2019 |

OTHER PUBLICATIONS

European Search Report; Application 18194173.3-1003, dated Mar. 26, 2019.

(Continued)

*Primary Examiner* — Galen H Hauth
(74) *Attorney, Agent, or Firm* — Duft & Bornsen, PC

(57) ABSTRACT

Systems and methods are provided for septa for acoustic cells. One embodiment is a method that includes fabricating a septum of a cell of an acoustic panel, by heating a material into a molten material, depositing the molten material to form a lower chamber of the septum that extends vertically upwards and includes an entry, iteratively depositing layers of the molten material, each layer comprising a filament at the entry that includes overhangs with respect to vertically adjacent layers, and forming openings at locations of the overhangs.

20 Claims, 9 Drawing Sheets

(51) Int. Cl.
*B33Y 10/00* (2015.01)
*G10K 11/172* (2006.01)
*B29C 64/106* (2017.01)
*B29D 99/00* (2010.01)
*B33Y 30/00* (2015.01)
*G10K 11/168* (2006.01)
*B29K 701/12* (2006.01)
*B29L 7/00* (2006.01)

(52) U.S. Cl.
CPC .. *B32B 2605/18* (2013.01); *B64D 2033/0206* (2013.01); *B64D 2033/0286* (2013.01)

(56) References Cited

U.S. PATENT DOCUMENTS

2015/0041248 A1 2/2015 Ichihashi
2015/0373470 A1* 12/2015 Herrera ................ G10K 11/172
 156/196
2017/0107909 A1 4/2017 Loewenstein et al.
2019/0112803 A1* 4/2019 Alstad .................... G10K 11/16

OTHER PUBLICATIONS

U.S. Appl. No. 15/212,454.
U.S. Appl. No. 15/434,378.
U.S. Appl. No. 15/588,791.
U.S. Appl. No. 15/604,697.
European examination report; Application 1819417.3; dated Apr. 3, 2021.

* cited by examiner

US 11,034,460 B2

ADDITIVELY MANUFACTURED SEPTA FOR ACOUSTIC PANELS

FIELD

The disclosure relates to the field of acoustic panels, and in particular, to septa for acoustic panels.

BACKGROUND

Acoustic panels include structures that are specifically designed to absorb, control and/or reflect sound. For example, acoustic panels may be utilized to reduce the noise impact of aircraft engines during takeoff, flight, and landing. Acoustic panels within an aircraft may further be utilized to reduce and/or redirect aircraft noise away from bystanders that may be proximate to an aircraft during takeoff and landing.

Presently, acoustic panels are painstakingly assembled cell by cell in order to conform each panel to the complex geometries of an aircraft. A septum is inserted into each of these cells to facilitate acoustic control, and there may be tens of thousands of septa within the acoustic panels for an aircraft. Such intensive processes for inserting septa into acoustic panels increase the expense of manufacturing an aircraft, and are therefore undesirable. Hence, designers of aircraft carefully balance concerns of comfort and cost when adding acoustic panels to an aircraft.

Therefore, it would be desirable to have a method and apparatus that take into account at least some of the issues discussed above, as well as other possible issues.

SUMMARY

Embodiments described herein provide septa that are fabricated via additive manufacturing processes. These septa may therefore be fabricated as integral components of acoustic cells and/or panels. The septa described herein utilize a unique multi-layer geometry that provides a desired size and number of flow pathways into a corresponding inner chamber of an acoustic cell. This eliminates the need for septa that are made from different materials than their corresponding acoustic cells. Further, this eliminates the need for separate processes of insertion and bonding of septa into their acoustic cells. Still further, because the size and number of flow pathways can be precisely controlled at the design stage, the septa described herein enable precisely calibrated acoustic control.

One embodiment is a method that includes fabricating a septum of a cell of an acoustic panel, by heating a material into a molten material, depositing the molten material to form a lower chamber of the septum that extends vertically upwards and includes an entry, iteratively depositing layers of the molten material, each layer comprising a filament at the entry that includes overhangs with respect to vertically adjacent layers, and forming openings at locations of the overhangs.

A further embodiment is a non-transitory computer readable medium embodying programmed instructions which, when executed by a processor, are operable for performing a method. The method includes fabricating a septum of a cell of an acoustic panel, by heating a material into a molten material, depositing the molten material to form a lower chamber of the septum that extends vertically upwards and includes an entry, iteratively depositing layers of the molten material, each layer comprising a filament at the entry that includes overhangs with respect to vertically adjacent layers, and forming openings at locations of the overhangs.

A further embodiment is an apparatus that includes a septum of an acoustic cell. The septum includes a lower chamber that extends vertically upwards and includes an entry, and a stack comprising layers of material disposed atop the entry of the lower chamber. Each layer of the stack comprises a filament at the entry and includes overhangs with respect to vertically adjacent layers, and openings that are disposed between the layers at locations of the overhangs and that result from the overhangs extending beyond adjacent layers.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
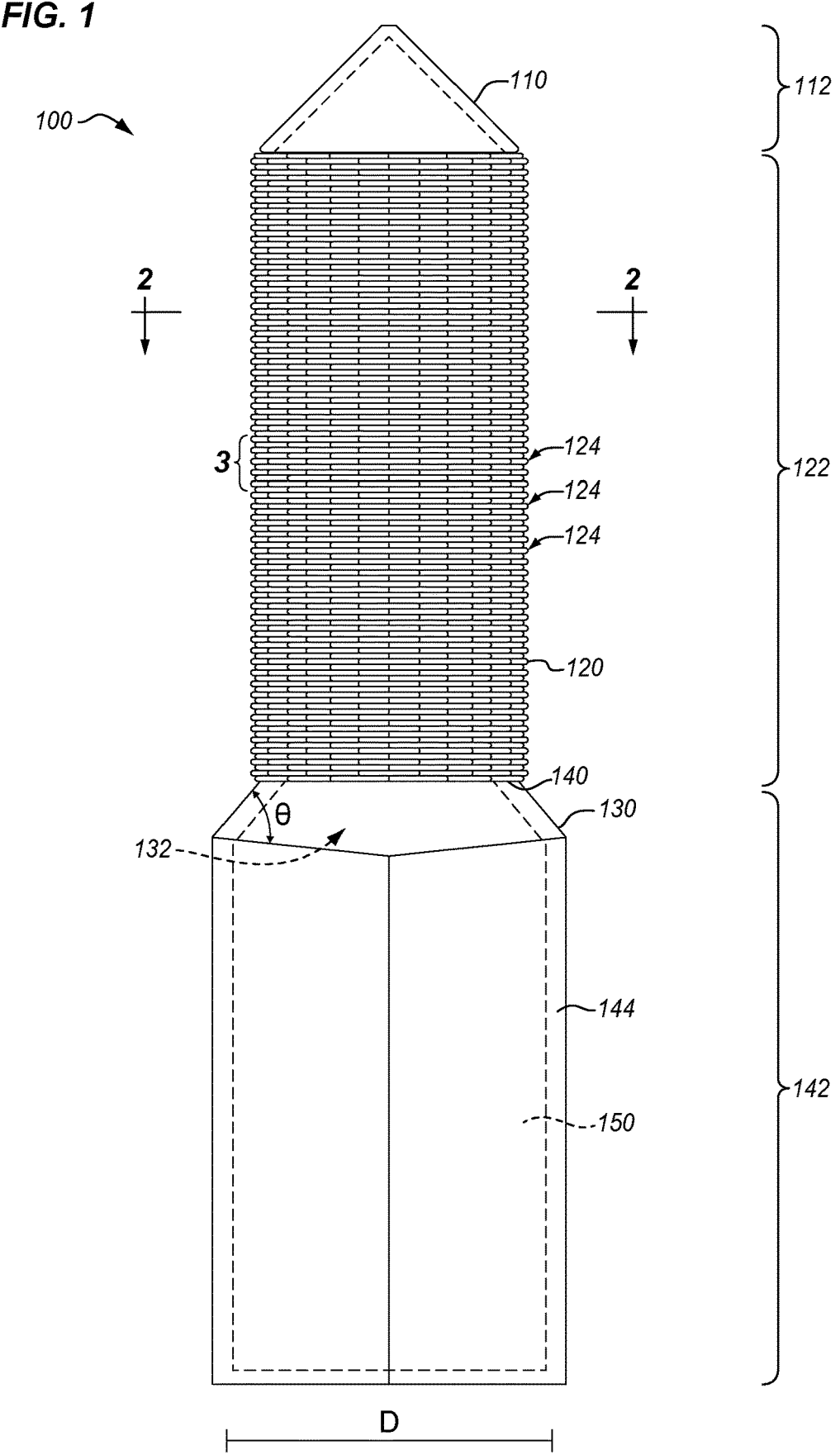
FIG. 1 is a side view of a septum for an acoustic cell in an illustrative embodiment.

FIG. 1 is a side view of a septum 100 for an acoustic cell in an illustrative embodiment. Septum 100 comprises an integral material (e.g., a thermoplastic part) that provides small flow pathways (e.g., having diameters between one ten thousandth of an inch and one thousandth of an inch) into a lower chamber 150 that extends vertically upwards and includes an entry 132. This facilitates control of acoustic energy when septum 100 is placed within an acoustic cell.

In this embodiment, septum 100 comprises three regions, each of which may be made from a thermoplastic such as Poly Aryl Ether Ketone (PAEK), a polycarbonate (PC) polyetherimide (PEI) blend, etc. Such materials may be utilized by additive manufacturing systems such as fused filament fabrication systems, wherein septum 100 is manufactured by fused desposition of a series of layers of material. Region 142 includes wall 144 (e.g., a solid wall of thermoplastic), which surrounds and defines lower chamber 150. Ramp 130 is a portion of wall 144 that decreases a diameter (D) of lower chamber 150 until reaching the entry 132. An angle at which ramp 130 proceeds may depend upon a maximum ramp angle allowed by the additive manufacturing process. For example, if a maximum ramp angle for a fused filament fabrication system is forty five degrees, the angle (θ) of ramp 130 may be limited to forty five degrees. Perimeter 140 surrounds the entry 132. Lower chamber 150 may be fabricated via fused filament fabrication, or any other suitable process.

Region 122 includes stack 120, which includes multiple layers 124 of material. The geometry of layers 124 creates small openings/flow pathways between layers 124, which facilitates control of acoustic energy within an acoustic cell. Region 112 defines a cap 110, such as a solid cap for septum 100. While a cap 110 that is solid is illustrated in FIG. 1, in further embodiments, cap 110 may comprise an additional amount of the layers 124. These additional layers may decrease in diameter as they are additively manufactured and stacked on top of each other to form a cone-like structure. Such an embodiment enables the placement of flow pathways within cap 110. In still further embodiments, cap 110 may be fabricated completely flat, so long as cap 110 is fabricated such that it forms a base layer of septum 100 (e.g., so long as septum 100 is fabricated upside-down, from the top downwards). Regardless of the type of cap 110 utilized by septum 100, septum 100 does not include any flow pathways larger than those defined by the gaps between layers 124 (e.g., no flow pathways have a diameter larger than ten thousandths of an inch).

Figure 2:
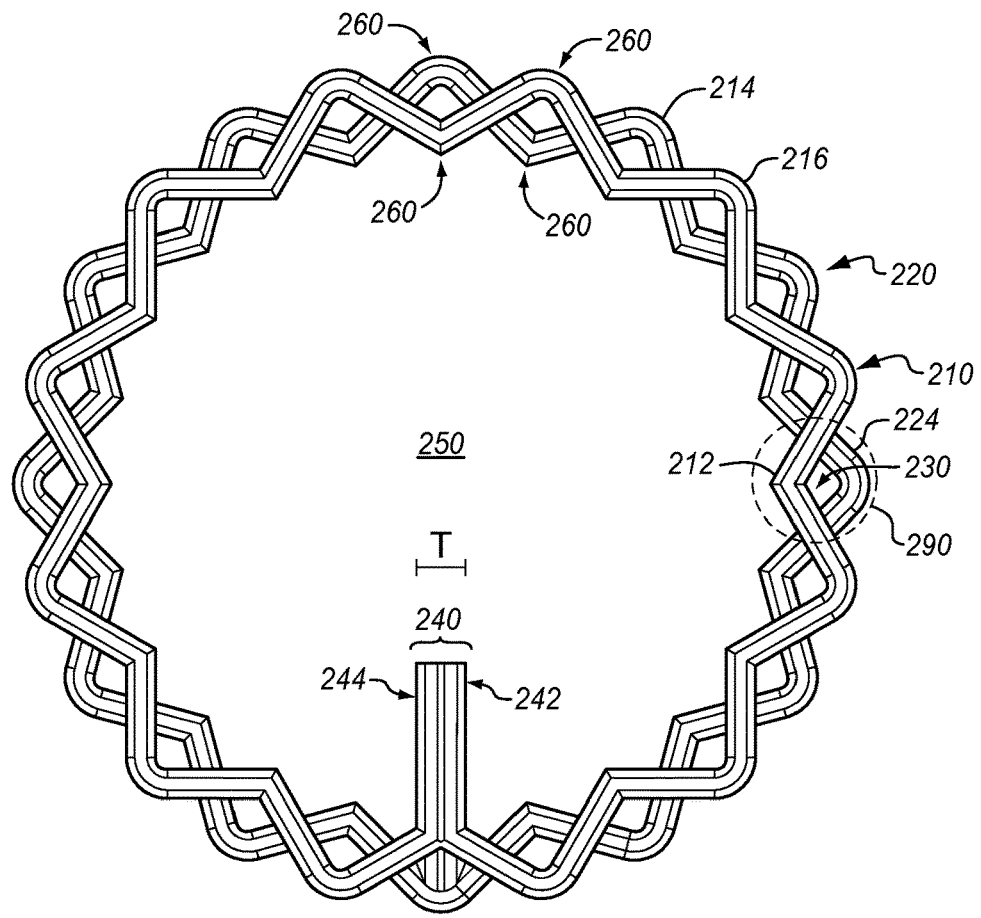
FIG. 2 is a section cut view of multiple layers of the septum of FIG. 1 in an illustrative embodiment.
Figure 3:
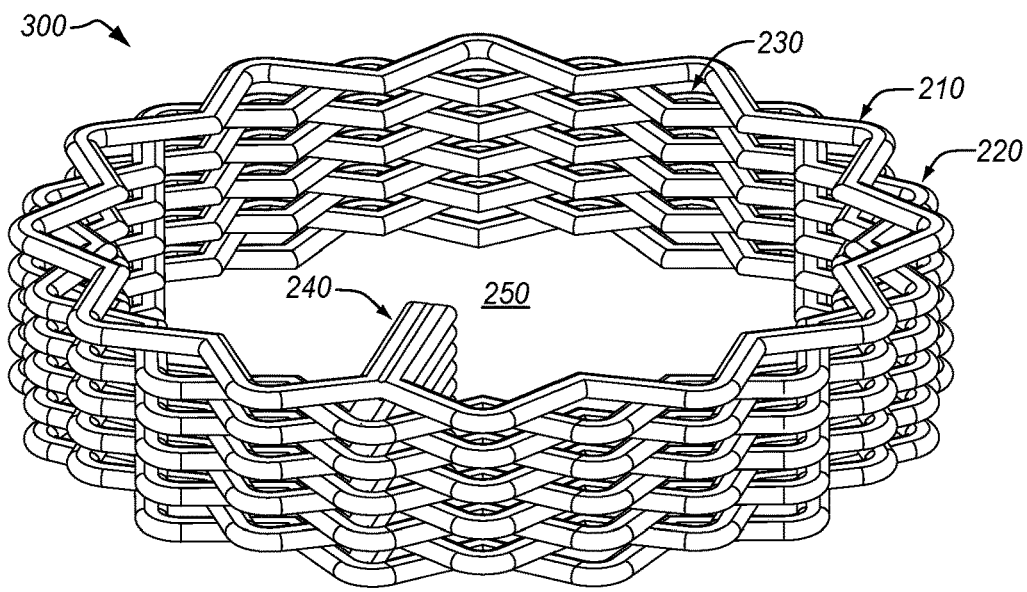
FIG. 3 is a perspective view of multiple layers of the septum of FIG. 1 in an illustrative embodiment.

Further discussion of layers 124 is provided with regard to FIGS. 2-3. FIG. 2 is a section cut of multiple layers of septum 100 of FIG. 1 in an illustrative embodiment, and corresponds with view arrows 2 of FIG. 1.

In this embodiment, first layer 210 and additional layer 220 are illustrated. Each layer comprises a single pathway of deposited material that follows perimeter 140 of FIG. 1, such as thermoplastic deposited by a single nozzle of a fused filament fabrication system. Furthermore, each layer forms a shape that is hollow and bounded, such as a filament 216 defining a multi-pointed star shape formed from vertices 260 comprising N protrusions 214 and recesses 212. The shape of additional layer 220 is rotated with respect to first layer 210. This causes vertices 260 in additional layer 220 to be offset from vertices 260 in first layer 210. The offset may result from a translation or a rotation of vertices 260 that are in different layers. For example, as shown in FIG. 2, protrusions 224 at additional layer 220 may partially cover recesses 212 of first layer 210, resulting in overhangs 290 wherein a portion of one layer extends laterally beyond a portion/border/boundary of a vertically adjacent layer. Recesses in each layer therefore align with protrusions of adjacent layers. In this manner, the hollow portion 250 of each layer (positioned over entry 132) extends beyond adjacent layers. Phrased differently, a hollow portion 250 of additional layer 220 extends beyond filament 216 of an adjacent layer (e.g., first layer 210) to form openings 230. Openings 230 are therefore proximate to vertices 260. In these embodiments, thicker filaments may result in a need for larger overhangs in order to form openings of a desired size.

FIG. 2 also illustrates that each layer may include a seam 240. In this embodiment, seam 240 comprises side 242, as well as side 244. For example, in fused filament fabrication, side 242 may be deposited during initial fabrication of first layer 210, while side 244 may be deposited at the end of fabrication, each side having a thickness of T/2. This ensures that any inconsistencies or variations in depositing that are associated with the beginning or ending of a layer do not undesirably alter the size of flow pathways between layers.

FIG. 3 is a perspective view of multiple layers of septum 100 of FIG. 1 in an illustrative embodiment. Specifically, FIG. 3 corresponds with view arrows 3 of FIG. 1. This view illustrates additional layers 300, and also illustrates that seams 240 for each layer may be placed atop each other, even though the protrusions and recesses of layers are not aligned with adjacent layers.

Figure 4:
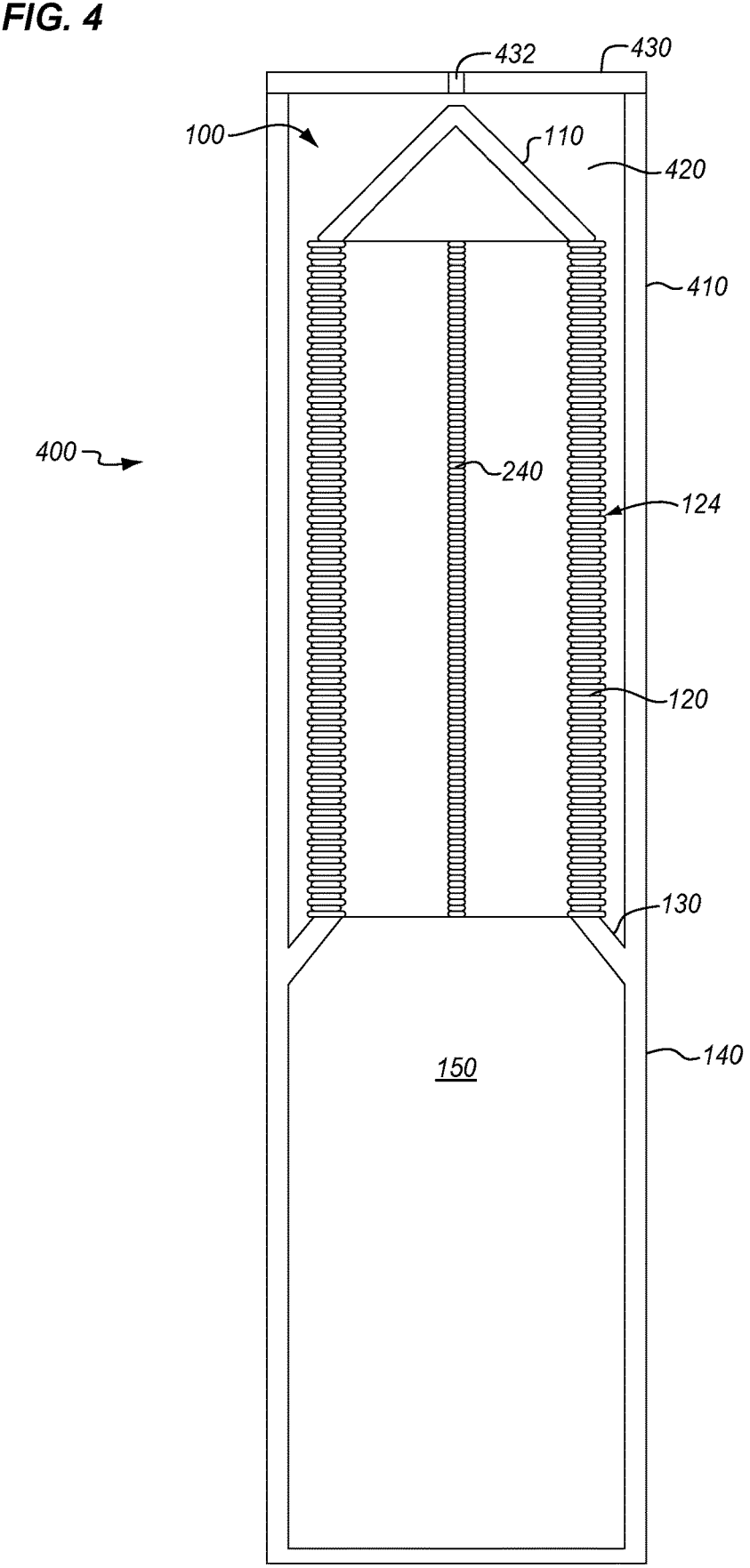
FIG. 4 is a section cut view of an acoustic cell in an illustrative embodiment.

With an understanding of stack 120 provided with respect to FIGS. 2-3, FIG. 4 provides a section cut view of an acoustic cell 400 in an illustrative embodiment. In this embodiment, acoustic cell 400 includes lower chamber 150, which is defined by perimeter 140. Acoustic cell 400 also includes upper chamber 420, which is defined by wall 410 and facesheet 430. Acoustic energy may enter upper chamber 420 of acoustic cell 400 via opening 432 in facesheet 430. Acoustic energy may further travel through openings 230 between layers of stack 120 in order to enter lower chamber 150. That is, the openings 230 perform acoustic control by causing septum 100 to vibrate in a way that provides control of acoustic phase and energy. All of the components of acoustic cell 400 may be fabricated together via additive manufacturing in order to form an integral piece of material.

Figure 5:
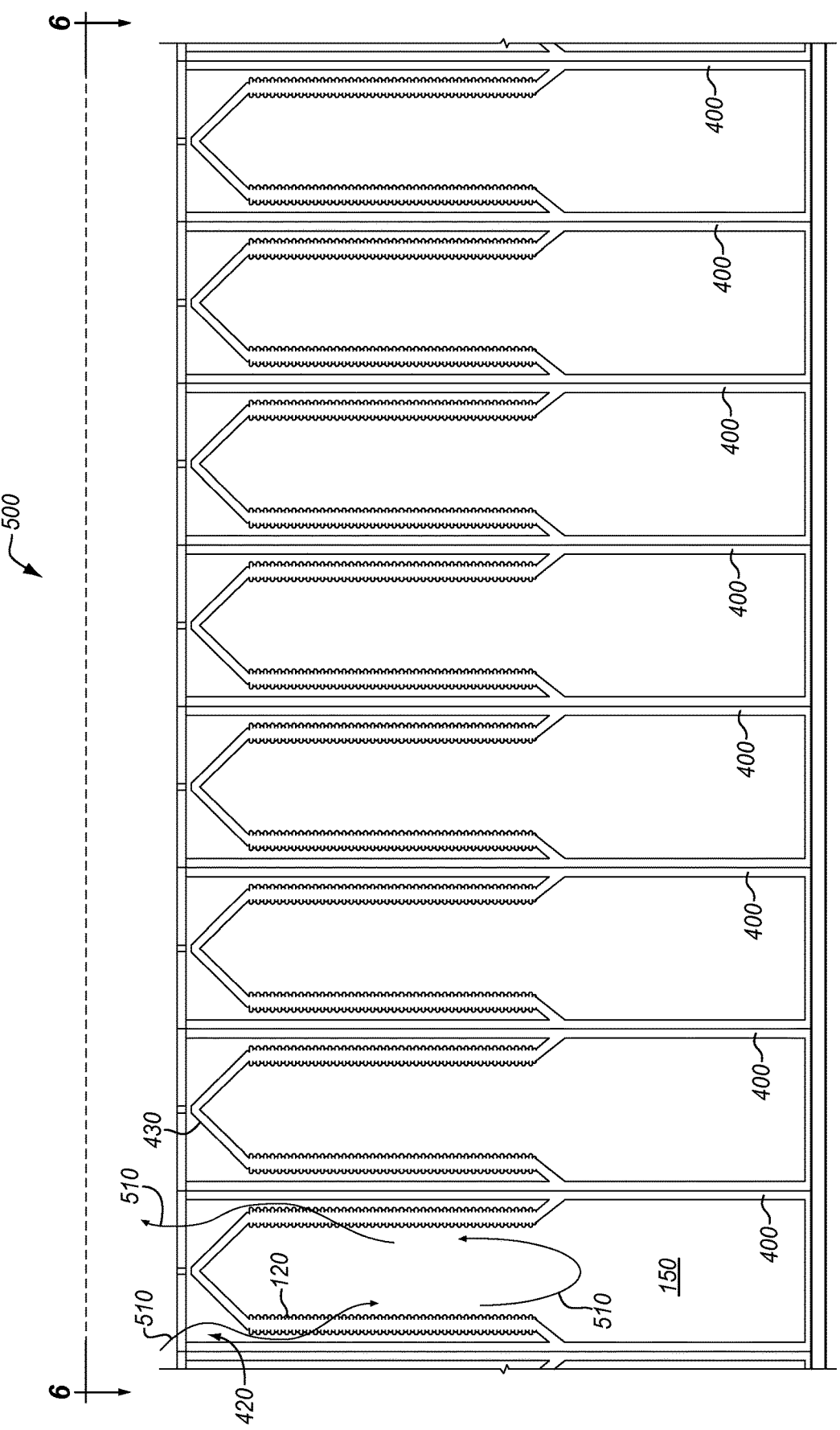
FIG. 5 is a cut-through view of an acoustic panel in an illustrative embodiment.
Figure 6:
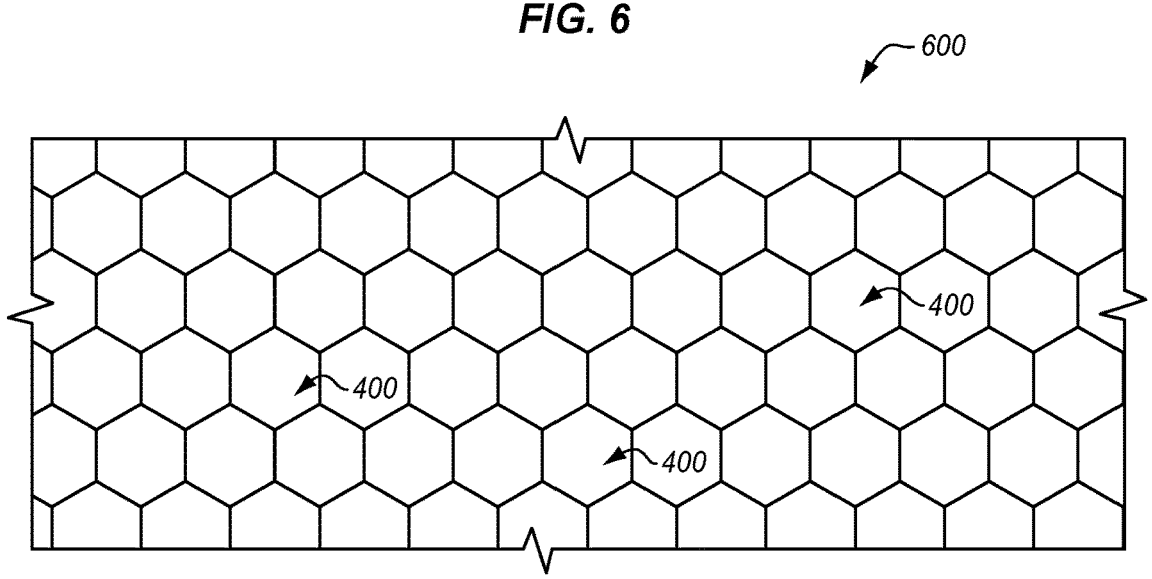
FIG. 6 is a top view of an acoustic panel in an illustrative embodiment.

FIG. 5 is a cut-through view of an acoustic panel 500 in an illustrative embodiment. FIG. 5 also illustrates how acoustic energy may be controlled by acoustic cells 400 of acoustic panel 500. As shown in FIG. 5, acoustic wave energy 510 may enter upper chamber 420 of an acoustic cell via facesheet 430, and then travel into lower chamber 150 via stack 120. Acoustic wave energy 510 may then be controlled via phasing and/or be damped as a septum produces out-of-phase wave cancellations within acoustic cell 400, before exiting acoustic cell 400. FIG. 6 is a top view of an acoustic panel in an illustrative embodiment. FIG. 6 corresponds with view arrows 6 of FIG. 5. FIG. 6 illustrates that acoustic cells 400 may be arranged in any suitable fashion on acoustic panel 500, and may have any suitable shapes. For example, tessellating shapes such as hexagons or squares may be used in order to ensure a desired density of acoustic cells 400.

Figure 7:
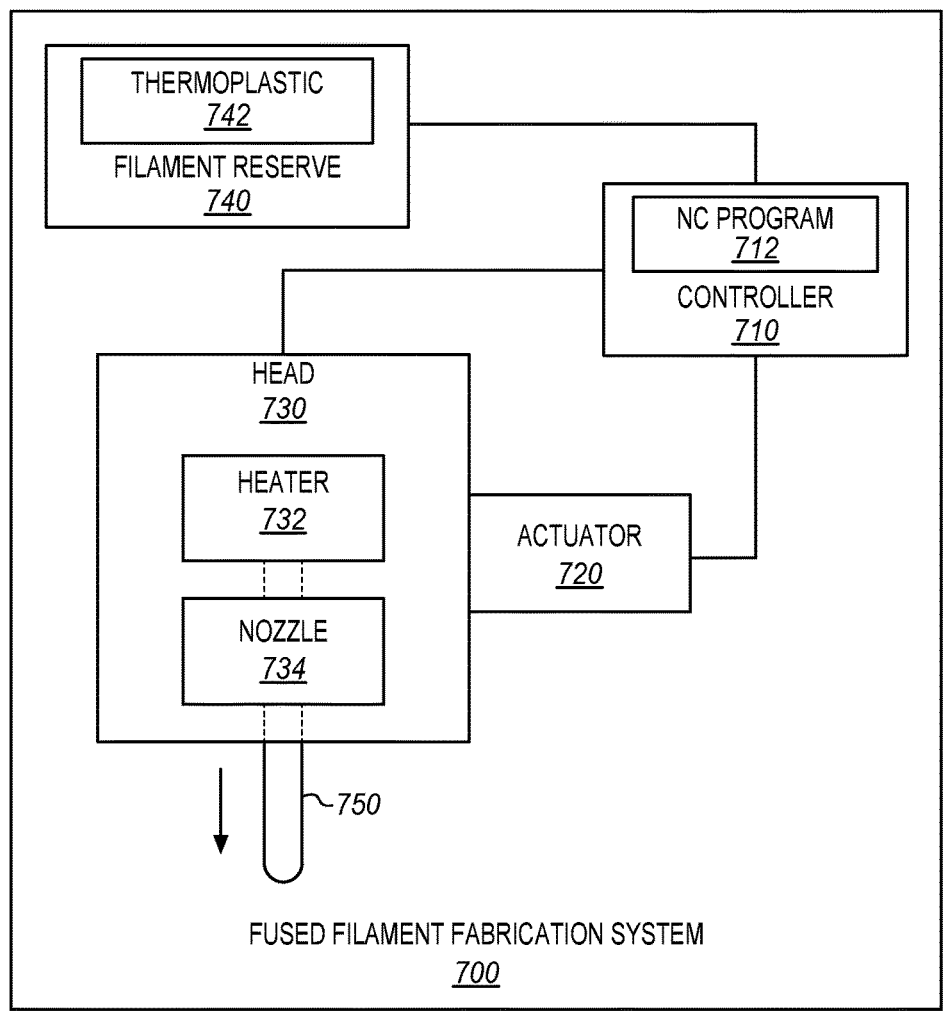
FIG. 7 is a block diagram of a fused filament fabrication system in an illustrative embodiment.

With a discussion of septum 100 and corresponding acoustic panels provided above, the discussion turns to additive manufacturing systems and techniques that may be utilized to fabricate septum 100. FIG. 7 is a block diagram of a fused filament fabrication system 700 in an illustrative embodiment. Fused filament fabrication system 700 comprises any suitable system that utilizes a continuous filament of thermoplastic to fabricate a three dimensional part. In this embodiment, fused filament fabrication system 700 includes actuator 720, which moves head 730 into various positions and/or orientations during additive manufacturing. Head 730 includes heater 732, which melts thermoplastic 742 from filament reserve 740 to form molten thermoplastic 750. Molten thermoplastic 750 is provided to nozzle 734, which deposits the molten thermoplastic 750 at desired locations in accordance with instructions from controller 710. Controller 710 may direct the actions of actuator 720, heater 732, and/or nozzle 734 based on instructions stored in a Numerical Control (NC) program, such as an NC program 712. Controller 710 may be implemented, for example, as custom circuitry, as a hardware processor executing programmed instructions, or some combination thereof.

Illustrative details of the operation of fused filament fabrication system 700 will be discussed with regard to FIG. 8. Assume, for this embodiment, that fused filament fabrication system 700 has been loaded with a filament of material, and that controller 710 has started fabrication based on an NC program stored in memory.

Figure 8A:
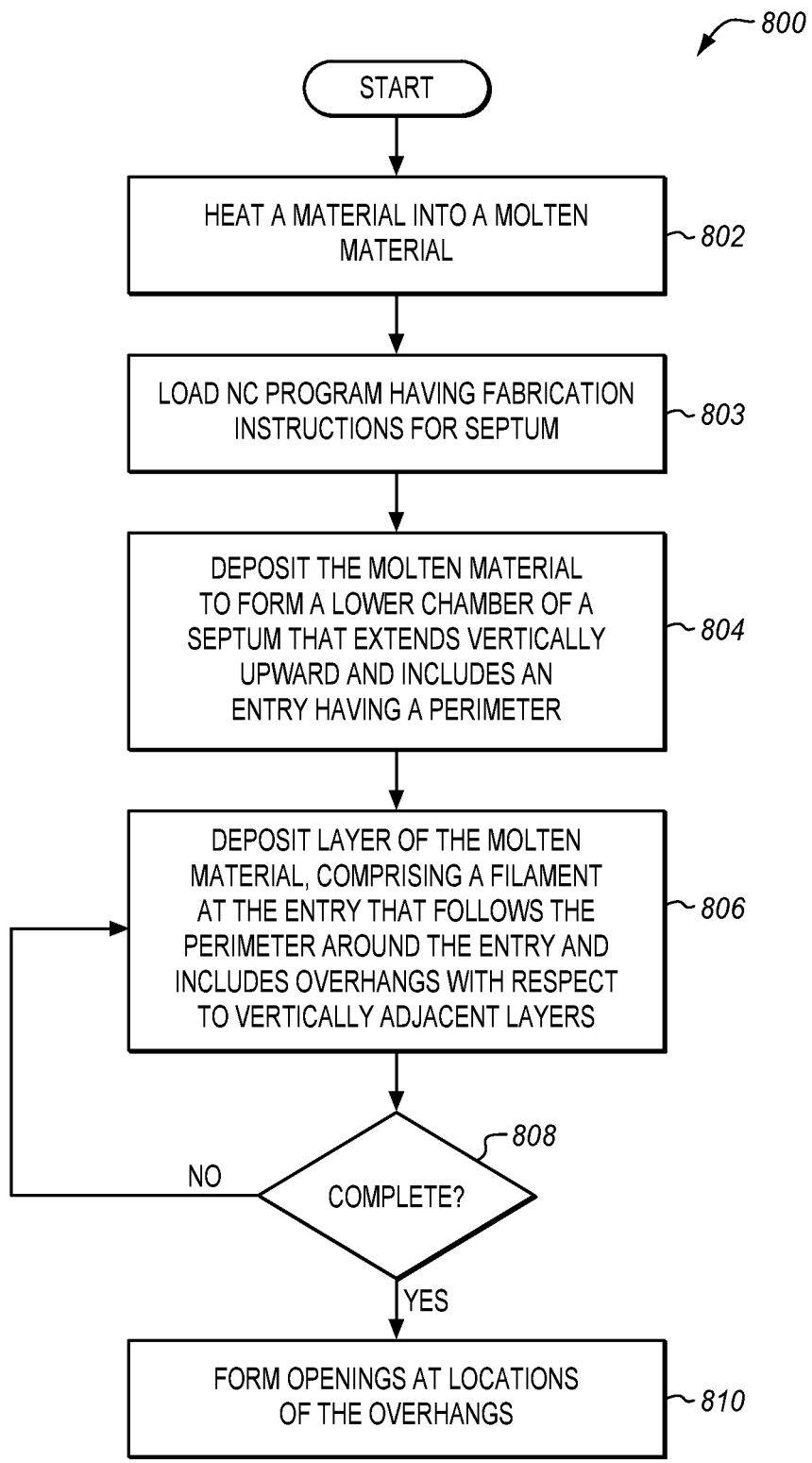
FIG. 8A is a flowchart illustrating a method for using additive manufacturing to fabricate a septum for an acoustic cell in an illustrative embodiment.
Figure 8B:
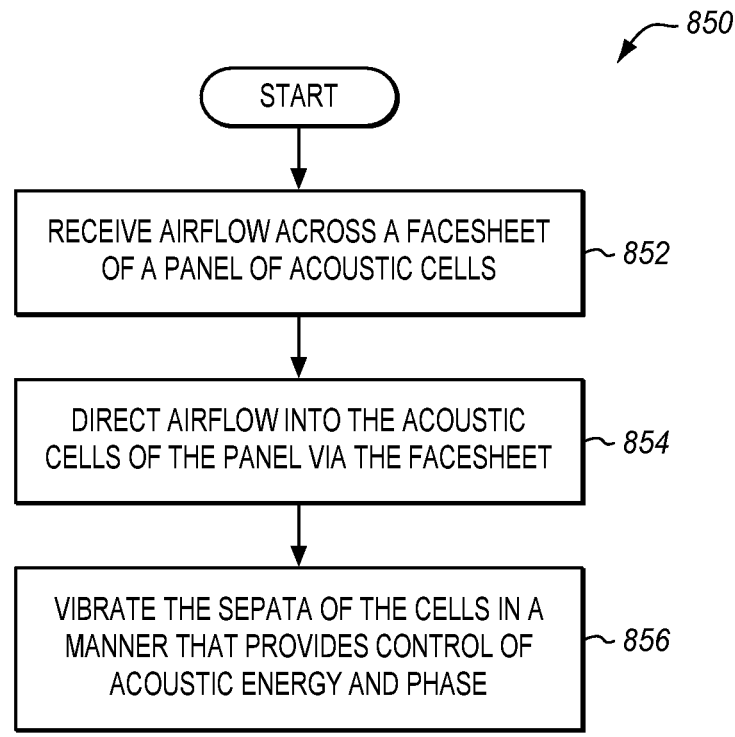
FIG. 8B is a flowchart illustrating a method for controlling acoustic energy in an illustrative embodiment.

FIG. 8A is a flowchart illustrating a method 800 for using additive manufacturing to fabricate a septum of an acoustic cell in an illustrative embodiment. The steps of method 800 are described with reference to fused filament fabrication system 700 of FIG. 7, but those skilled in the art will appreciate that method 800 may be performed in other additive manufacturing environments as desired. The steps of the flowcharts described herein are not all inclusive and may include other steps not shown. The steps described herein may also be performed in an alternative order. Furthermore, these steps may be performed by a machine operating in accordance with a Numerical Control (NC) program, such as the NC program 712 of FIG. 7 in order to engage in an automatically controlled process.

Controller 710 directs actuator 720 to move nozzle 734 into position above a location where fabrication will initiate for septum 100. Controller 710 directs heater 732 to proceed with heating a material (e.g., thermoplastic 742) to a melting temperature (e.g., 720° Fahrenheit), resulting in a molten material (e.g., molten thermoplastic 750) (step 802). Controller 710 loads the NC program 712, and proceeds to acquire fabrication instructions for septum 100 indicating how fused filament fabrication system 700 is moved, where molten material should be deposited, and how much molten material is deposited (step 803). Controller 710 further directs actuator 720 and nozzle 734 to actively deposit molten material to initiate fabrication of septum 100. This includes depositing molten material that forms lower chamber 150 of septum 100 which extends vertically upward and includes entry 132 having perimeter 140 (step 804).

With lower chamber 150 fabricated, controller 710 proceeds to direct actuator 720 and nozzle 734 in depositing additional amounts of molten material. Specifically, controller 710 directs actuator 720 and nozzle 734 to deposit a layer of the molten material as a filament at entry 132 (e.g., a filament that follows perimeter 140 around entry 132) (step 806). The filament forms a shape that is hollow and bounded. Further filamentous layers are added, and each layer includes overhangs with respect to vertically adjacent layers. The process continues, iteratively depositing additional layers. If controller 710 determines that not all layers 124 have been deposited (step 808), then controller 710 may direct actuator 720 and nozzle 734 to deposit an additional layer by returning to step 806.

Layers 124 solidify (e.g., cool), forming openings 230 between vertically adjacent layers at locations of overhangs 290 as overhangs 290 droop. These openings 230 lead into lower chamber 150 of septum 100. For example, a filament of each layer 124 may be deposited with slight overhangs that proceed beyond the filaments of layers 124 that are vertically adjacent (e.g., touching) in order to form openings 230. In such an embodiment, each filament may include cantilevered protrusions deposited onto a location without underlying support, and these protrusions droop downward after the filament is deposited in order to form openings 230. Stack 120 may comprise any suitable number of layers, such as one hundred layers or more.

The unique geometry of stack 120 allows for openings 230 to be placed within septum 100 via additive manufacturing techniques, which makes septum 100 viable to enable controlled flow of acoustic energy through upper chamber 420 and lower chamber 150. Furthermore, because septum 100 is fabricated via additive manufacturing techniques, an acoustic panel 500 may be fabricated as one integral piece. This facilitates automated manufacturing of acoustic panels, thereby reducing cost. Furthermore, a remaining portion of an acoustic cell (e.g., walls 410, facesheet 430) may also be fabricated via the same additive manufacturing process as used to fabricate septum 100. This allows for the acoustic cell and its corresponding septum to be fabricated at the same time.

Using the septa described above, a method may be performed for an acoustic cell. This is illustrated with regard to method 850 of FIG. 8B. The method may include, for example, receiving airflow across a facesheet of a panel comprising multiple acoustic cells (step 852). The method also includes directing the airflow into cells of the acoustic panel via the facesheet (step 854), and vibrating the septa of the cells in a manner that provides control of acoustic energy and phase (step 856).

Figure 9:
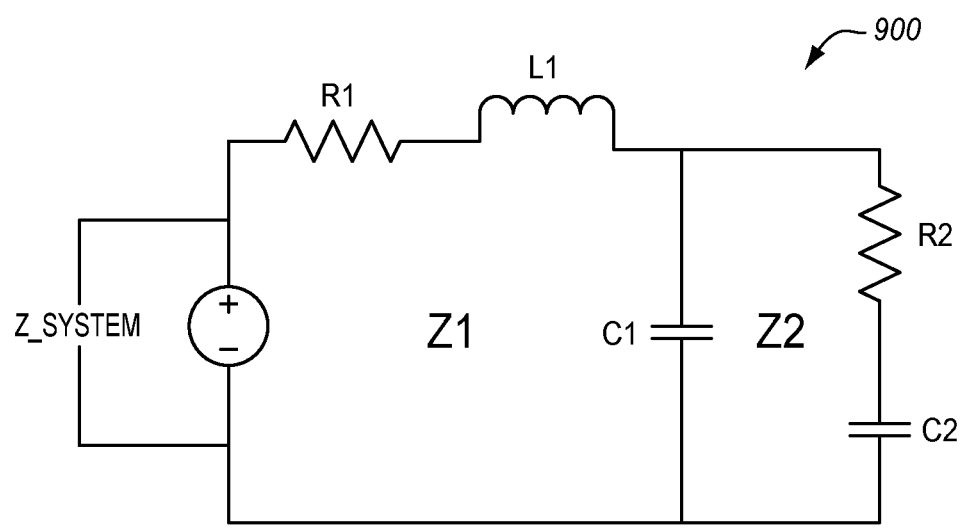
FIG. 9 is a circuit diagram illustrating acoustic control in an exemplary embodiment.

Calibrated control of acoustic energy via acoustic cells may be modeled via a circuit diagram. Specifically, utilizing the circuit diagram 900 of FIG. 9, an impedance of an entire acoustic panel can be calibrated. In such an embodiment, R1 and R2 represent resistors of the Resistive Inductive Capacitive (RLC) circuit of FIG. 9, C1 and C2 represent capacitors of the RLC circuit of FIG. 9, and L1 represents an inductor of the RLC circuit. From these features, Z1, Z2, and Z_system (representing impedance of various portions of the circuit) may be calculated. Specifically, R1 corresponds to a resistance of acoustic energy provided by a facesheet of the panel. L1 corresponds to impedance of (mass) air flow caused by the shape, number, and/or size of openings in the facesheet (and may, for example, be calibrated by adjusting a Percent Open Area (POA) for the facesheet). Continuing onward, C1 corresponds to a volume of air capacitance between a septum and the facesheet, while C2 corresponds to a volume of air capacitance between the septum and a backing sheet. R2 is defined by resistance of acoustic energy caused by travel through the septum. Z1 may be calibrated by varying R1, L1, and C1 as desired. In a similar fashion, Z2 may be calibrated based on values for R2 and C2. In this manner, Z_system for the entirety of the acoustic panel may rapidly be calculated. For example, the percent open area of a facesheet 430 may be chosen to provide a specific level of resistance to airflow into acoustic cell 400 that resists/dampens a selected frequency (or frequencies) of acoustic energy. Meanwhile, a thickness of facesheet 430 may provide an inductive response that regulates mass flow of air into acoustic cell 400. A septum 100 within acoustic cell 400 may define capacitance (energy storage) of the cell, and further may resist airflow. Thus, volumes of free space within acoustic cell 400, as well as the total volume of acoustic cell 400 may be considered and programmatically controlled in a double Degree of Freedom (DOF) system to control the acoustic properties of acoustic cell 400 and control/damp specific frequencies. This technique may be particularly helpful in scenarios where specific frequencies of noise from an aircraft engine are perceptible to passengers of the aircraft and are known to cause discomfort to passengers of the aircraft.

EXAMPLES

In the following examples, additional processes, systems, and methods are described in the context of an acoustic panel with septa fabricated via additive manufacturing processes.

Figure 10:
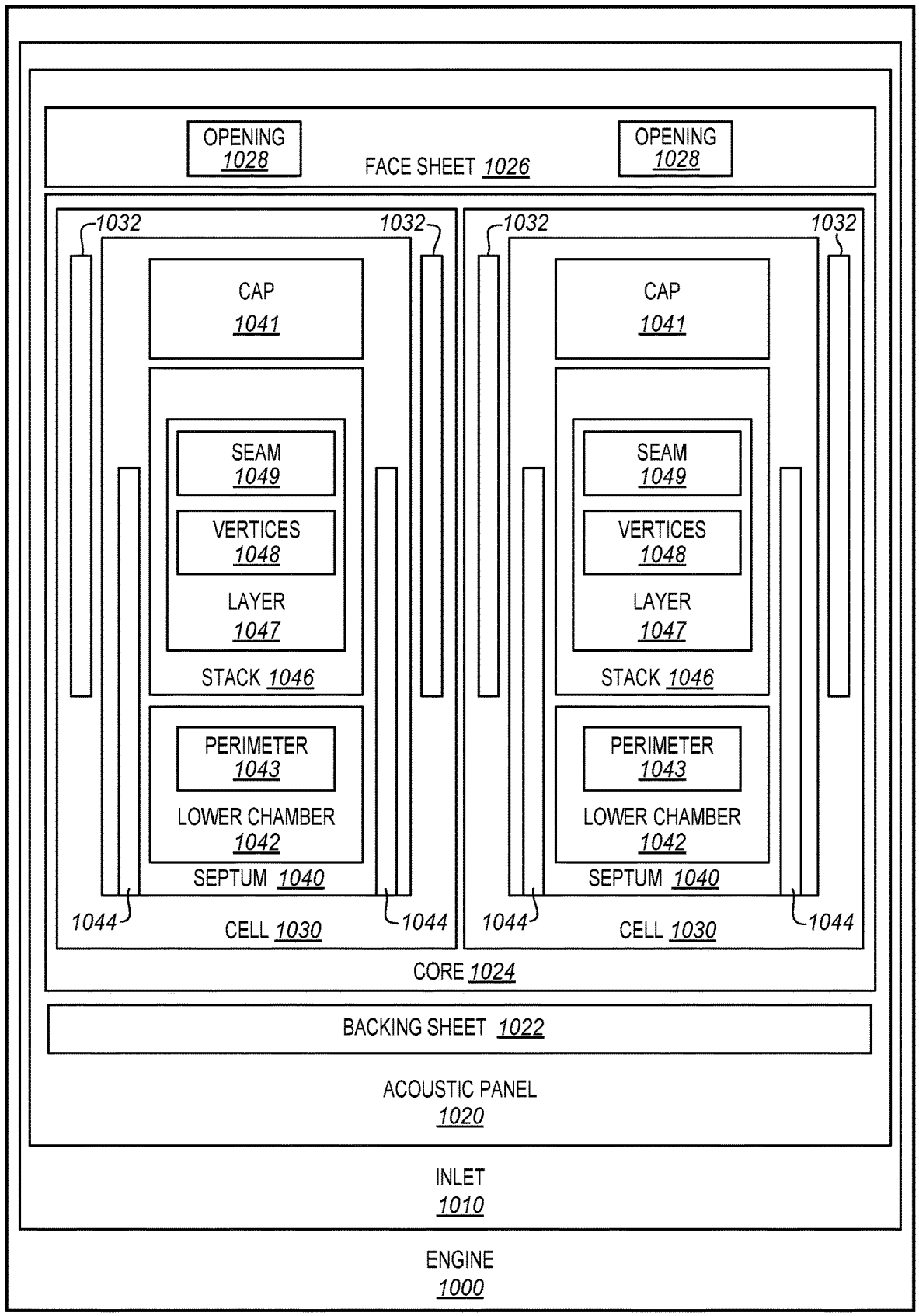
FIG. 10 is a block diagram of an acoustic panel mounted at an engine in an illustrative embodiment.

FIG. 10 is a block diagram of an acoustic panel 1020 mounted at an engine 1000 (e.g., an engine of an aircraft) in an illustrative embodiment. In this embodiment, inlet 1010 of engine 1000 includes one or more acoustic panels 1020 to control acoustic energy. Acoustic panel 1020 includes backing sheet 1022, which forms a base/floor for core 1024 of acoustic panel 1020. Core 1024 includes a number of acoustic cells 1030. Each acoustic cell 1030 includes walls 1032, as well as septum 1040. Each septum 1040 includes walls 1044 defining a lower chamber 1042 having a perimeter 1043. Stack 1046 is disposed atop perimeter 1043, and includes layers 1047. Each layer 1047 includes vertices 1048, and may include a seam 1049. Cap 1041 terminates septum 1040. A facesheet 1026 with openings 1028 covers each acoustic cell 1030, enabling acoustic energy to pass into acoustic cells 1030 for acoustic control.

Figure 11:
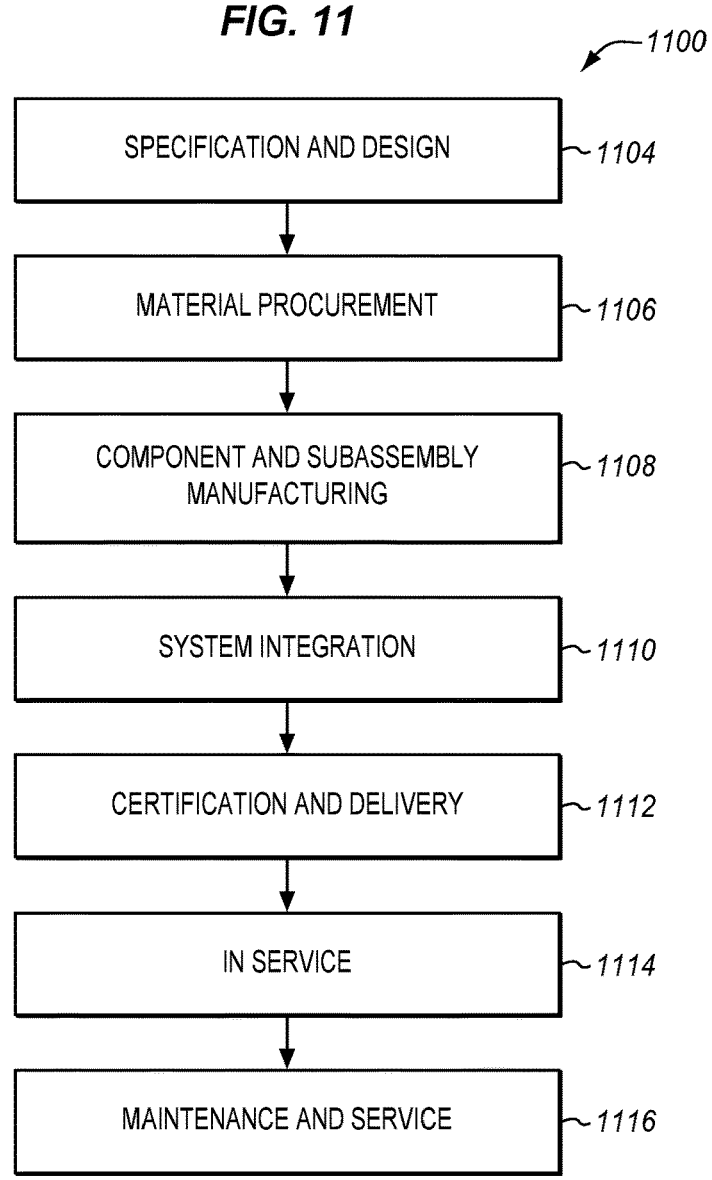
FIG. 11 is a flow diagram of aircraft production and service methodology in an illustrative embodiment.
Figure 12:
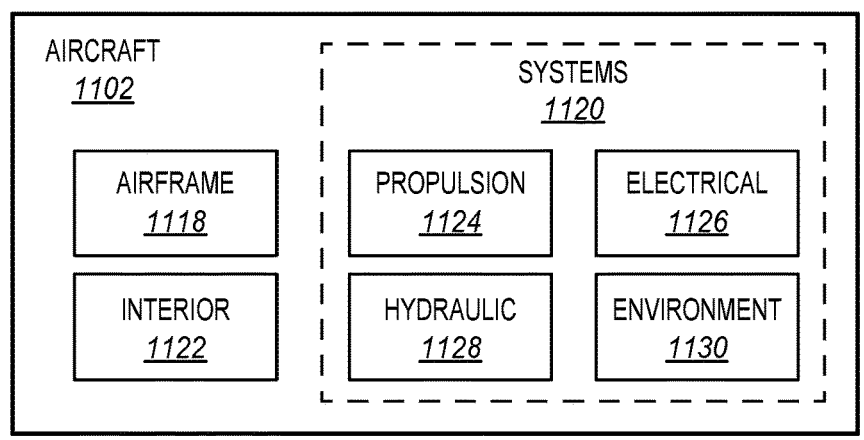
FIG. 12 is a block diagram of an aircraft in an illustrative embodiment.

Referring more particularly to the drawings, embodiments of the disclosure may be described in the context of an aircraft manufacturing and service method 1100 as shown in FIG. 11 and an aircraft 1102 as shown in FIG. 12. During pre-production, illustrative method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on). Apparatus and methods embodied herein may be employed during any one or more suitable stages of the production and service method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion 1124, electrical 1126, hydraulic 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by illustrative method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as but not limited to the automotive, agricultural, marine, appliance, and similar industries.

As already mentioned above, apparatus and methods embodied herein may be employed during any one or more of the stages of the production and service method 1100. For example, components or subassemblies corresponding to production stage 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116. For example, the techniques and systems described herein may be used for steps 1106, 1108, 1110, 1114, and/or 1116, and/or may be used for airframe 1118 and/or interior 1122. These techniques and systems may even be utilized for systems 1120, including for example propulsion 1124, electrical 1126, hydraulic 1128, and/or environmental 1130.

In one embodiment, an acoustic panel 500 is coupled with a portion of airframe 1118, and is manufactured during component and subassembly manufacturing 1108. The acoustic panel 500 may continue in service 1114 until wear renders the acoustic panel 500 unusable. Then, in maintenance and service 1116, the acoustic panel 500 may be discarded and replaced with a newly manufactured part. Inventive components and methods may be used throughout component and subassembly manufacturing 1108 to manufacture another of acoustic panels 500 and septa for those acoustic panels 500.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
fabricating a septum of a cell of an acoustic panel, by:
heating a material into a molten material;
depositing the molten material to form a lower chamber of the septum that extends vertically upwards and includes an entry;
subsequently iteratively depositing layers of the molten material atop the entry, each layer comprising a filament that includes overhangs with respect to vertically adjacent layers; and
forming openings at locations of the overhangs.

2. The method of claim 1 wherein:
iteratively depositing the layers comprises, for each layer, depositing a filament that extends beyond filaments of adjacent layers to form the overhangs.

3. The method of claim 1 wherein:
iteratively depositing the layers is performed such that each of the filaments is deposited as a multi-pointed star shape having vertices comprising recesses and protrusions, wherein recesses in each of the layers align with protrusions of vertically adjacent layers to form the openings.

4. The method of claim 3 further comprising:
drooping each protrusion downward after it is deposited.

5. The method of claim 1 wherein:
iteratively depositing the layers results in at least fifty layers, and
each layer forms at least ten openings with vertically adjacent layers.

6. The method of claim 1 wherein:
fabricating the septum is performed via fused filament fabrication.

7. The method of claim 1 wherein:
forming a seam at each layer, wherein seams of vertically adjacent layers are deposited atop each other.

8. The method of claim 1 wherein:
the openings have diameters between one ten thousandth of an inch and one thousandth of an inch in diameter.

9. The method of claim 1 further comprising:
depositing molten material to form a solid cap of material atop the layers.

10. The method of claim 1 further comprising:
depositing molten material to form a solid wall of material that surrounds the layers and forms an upper chamber of an acoustic cell.

11. The method of claim 1 wherein:
the molten material comprises thermoplastic.

12. A portion of an aircraft assembled according to the method of claim 1.

13. A non-transitory computer readable medium embodying programmed instructions which, when executed by a processor, are operable for performing a method comprising:
fabricating a septum of a cell of an acoustic panel, by:
heating a material into a molten material;
depositing the molten material to form a lower chamber of the septum that extends vertically upwards and includes an entry;
subsequently iteratively depositing layers of the molten material atop the entry, each layer comprising a filament that includes overhangs with respect to vertically adjacent layers; and
forming openings at locations of the overhangs.

14. The medium of claim 13 wherein:
iteratively depositing the layers comprises, for each layer depositing a filament that extends beyond filaments of adjacent layers to form the overhangs.

15. The medium of claim 13 wherein:
iteratively depositing the layers is performed such that each of the filaments is deposited as a multi-pointed star shape having vertices comprising recesses and protrusions, wherein recesses in each of the layers align with protrusions of vertically adjacent layers to form the openings.

16. The medium of claim 15 wherein the method further comprises:
drooping each protrusion downward after it is deposited.

17. The medium of claim 13 wherein:
iteratively depositing the layers results in at least fifty layers, and
each layer forms at least ten openings with vertically adjacent layers.

18. The medium of claim 13 wherein:
fabricating the septum is performed via fused filament fabrication.

19. The medium of claim 13 wherein the method further comprises:
forming a seam at each layer, wherein seams of vertically adjacent layers are deposited atop each other.

20. The medium of claim 13 wherein:
the molten material comprises thermoplastic.

* * * * *